US00RE41018E

(19) United States
(12) Reissued Patent
Chen

(10) Patent Number: US RE41,018 E
(45) Date of Reissued Patent: Dec. 1, 2009

(54) LIGHT SOURCE MODULE ARRANGED IN AN IMAGE SCANNING DEVICE FOR SCANNING A TRANSPARENT OBJECT

(76) Inventor: Emily Chen, No. 10 Yongkang St., Zhudong Town, Hsinchu County 310 (TW)

(21) Appl. No.: 11/498,301

(22) Filed: Aug. 1, 2006

Related U.S. Patent Documents

Reissue of:
(64) Patent No.: 6,771,401
Issued: Aug. 3, 2004
Appl. No.: 09/753,812
Filed: Jan. 3, 2001

(30) Foreign Application Priority Data

Jul. 5, 2000 (TW) ..... 89211591

(51) Int. Cl.
*H04N 1/04* (2006.01)
*H04N 1/46* (2006.01)
*H01L 27/00* (2006.01)

(52) U.S. Cl. ..... 358/512; 358/484; 358/487; 358/509; 358/506; 358/475; 358/497; 250/208.1

(58) Field of Classification Search ..... 358/497, 358/484, 487, 509, 512, 506
See application file for complete search history.

(56) References Cited

U.S. PATENT DOCUMENTS 5,258,857 A * 11/1993 Ichinose ..... 358/474
5,923,042 A * 7/1999 Mietta et al. ..... 250/559.06
6,133,565 A * 10/2000 Fujimoto et al. ..... 250/234

* cited by examiner

*Primary Examiner*—Houshang Safaipour
(74) *Attorney, Agent, or Firm*—Perkins Coie LLP

(57) ABSTRACT

A light source module arranged in an image scanning device having a scanning platform and an image-pickup module for scanning a transparent object is disclosed, The light source module includes a cover, a light source mounted in the cover for emitting light to the scanning platform for scanning a transparent object, a RGB filter mounted between the light source and the scanning platform for filtering off the light into RGB lights, a switching mechanism connected to the RGB filter for being controlled to alternately allow one of RGB lights to be transmitted to the scanning platform, and a transmission mechanism for carrying the light source, the RGB filter, and the switching mechanism to move with the image-pickup module for accomplishing the scanning operation to the transparent object.

41 Claims, 3 Drawing Sheets

LIGHT SOURCE MODULE ARRANGED IN AN IMAGE SCANNING DEVICE FOR SCANNING A TRANSPARENT OBJECT

Matter enclosed in heavy brackets [ ] appears in the original patent but forms no part of this reissue specification; matter printed in italics indicates the additions made by reissue.

FIELD OF THE INVENTION

The present invention relates to a light source module provided for scanning a transparent object, and more particularly to a light source module arranged in an image scanning device for scanning a transparent object.

BACKGROUND OF THE INVENTION

As the scanner is continuously advancing in manufacturing techniques and its price has dropped to a reasonable level, the scanner now has become an indispensable peripheral device for a standard PC. Owing to the rise of the processing speed of a central processing unit (CPU) in a standard PC and the requirement on high scanning quality for a standard PC user, the image scanning device capable of scanning various kinds of objects has already emerged in the scanner market. For example, an image scanning device which can respectively scan a reflective object (such as a textbook) and a transparent object (such as a film).

Referring now to FIG. 1, the flat-bed image scanning device of the prior art is implemented with using a contact image sensor (CIS) module 11 as the image-pickup module. The CIS module 11 underneath the scanning platform 10 is made up of a RGB light source 111, a rod lens 112, and a sensor chip 113 so as to scan a colored reflective object on the scanning platform 10. While the user tends to scan a transparent object with a flat-bed image scanning device, a transparency adapter (TA) 12 must be provided to be arranged in the flat-bed image scanning device in order to provide a penetrative light. Unfortunately, the transparency adapter (TA) 12 is able to provide a monochromatic light only, and thus it can not be applied to scan a colored transparent object.

Accordingly, the applicant tries to develop a light source module arranged in an image scanning device for solving the problems suffered from the prior art.

SUMMARY OF THE INVENTION

It is therefore an object of the present invention to provide a light source module arranged in an image scanning device for scanning a transparent object.

In accordance with a first preferred embodiment of the present invention, the image scanning device includes a scanning platform, an image-pickup module such as a contact image sensor (CIS) module, and a light source module. The light source module includes a cover, a monochromatic light source mounted in the cover for emitting a monochromatic light, a tricolor filtering device (i.e. RGB filters) mounted between the monochromatic light source and the scanning platform for filtering off the monochromatic light into three different monochromatic (i.e. R, G, B) lights, a switching mechanism connected to the tricolor filtering device for being controlled to alternately allow one of three different monochromatic lights to be transmitted to the scanning platform for scanning a transparent object, and a transmission mechanism for carrying the monochromatic light source, the tricolor filtering device, and the switching mechanism to move with the image-pickup module for accomplishing the scanning operation to the transparent object.

Preferably, the monochromatic light source is a cold cathode lamp. Moreover, the switching mechanism is implemented with a motor, and the transmission mechanism includes a stepping motor and a guiding rod.

In accordance with a second preferred embodiment of the present invention, the image scanning device includes a scanning platform, an image-pickup module such as a contact image sensor (CIS) module, and a light source module. The light source module includes a cover, a tricolor light source which is a RGB cold cathode lamp or a combination of red LED array, a green LED array, and a blue LED array and mounted in the cover for emitting three different monochromatic (i.e. R, G, B) lights to the scanning platform for scanning a transparent object, a switching mechanism which may be implemented with a controlled multiple-throw, single-pole switch and connected to the tricolor light source for being controlled to alternately allow one of three different monochromatic lights to be transmitted to the scanning platform, and a transmission mechanism for carrying the tricolor light source and the switching mechanism to move with the image-pickup module for accomplishing the scanning operation to the transparent object.

In accordance with a third preferred embodiment of the present invention, the image scanning device includes a scanning platform, an image-pickup module such as a contact image sensor (CIS) module, and a light source module. The light source module includes a cover, three monochromatic light sources, each of which has the same color, e.g. three white cold cathode lamps, and mounted in the cover for emitting a monochromatic light, a tricolor filtering devices (i.e. RGB filters) connected to the three monochromatic light sources for filtering off the monochromatic light into three different monochromatic (i.e. R, G, B) lights, a switching mechanism which may be implemented with a controlled multiple-throw, single-pole switch and connected to the three different monochromatic filtering devices for being controlled to alternately allow one of the three different monochromatic (i.e. R, G, B) lights to be transmitted to the scanning platform for scanning a transparent object, and a transmission mechanism for carrying the three monochromatic light sources, the tricolor filtering devices, and the switching mechanism to move with the image-pickup module for accomplishing the scanning operation to the transparent object.

In accordance with a fourth preferred embodiment of the present invention, the image scanning device includes a scanning platform, an image-pickup module such as a contact image sensor (CIS) module, and a light source module. The light source module includes a cover, three monochromatic light sources, each of which has a different color and mounted in the cover for emitting three different monochromatic lights (i.e. R, G, B) to the scanning platform for scanning a transparent object, three guiding devices, each of which is connected to one end of the three monochromatic light sources for guiding the three different monochromatic lights (i.e. R, G, B) to the scanning platform, a switching mechanism which may be implemented with a controlled multiple-throw, single-pole switch and connected to the three guiding devices for being controlled to alternately allow one of the three different monochromatic lights to be transmitted to the scanning platform, and a transmission mechanism for carrying the three different monochromatic light sources, the three guiding devices, and the switching mechanism to move with the image-pickup module for accomplishing the scanning operation to the transparent object.

Now the foregoing and features of the present invention may best be understood through the following descriptions with reference to the accompanying drawings, in which:

DETAILED DESCRIPTION OF THE PREFERRED EMBODIMENTS

Figure 1:
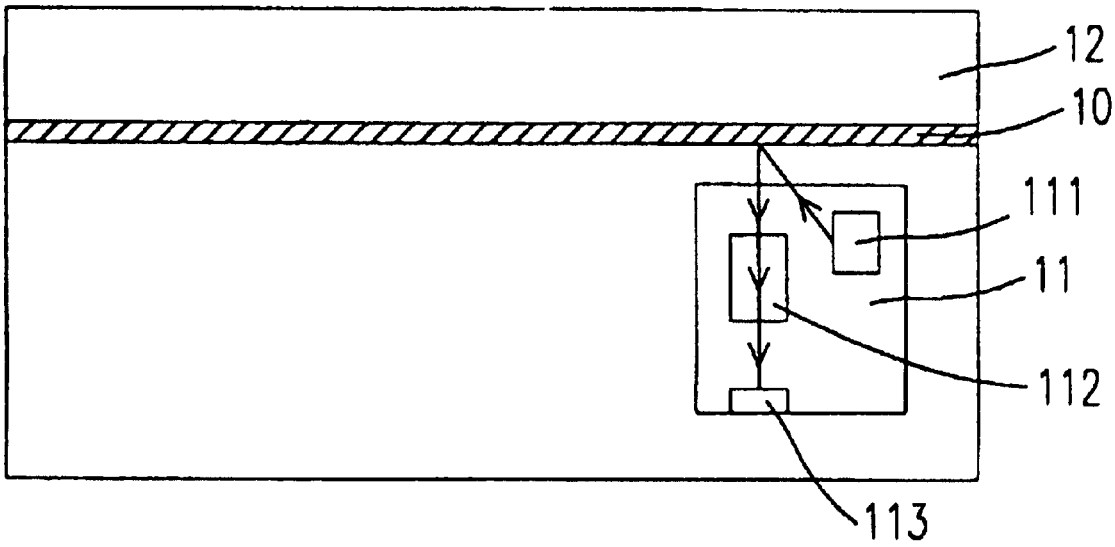
Fig. 1(PRIOR ART)
FIG. 1 is a schematic diagram showing the image scanning device for scanning a transparent object according to the prior art.
Figure 2A:
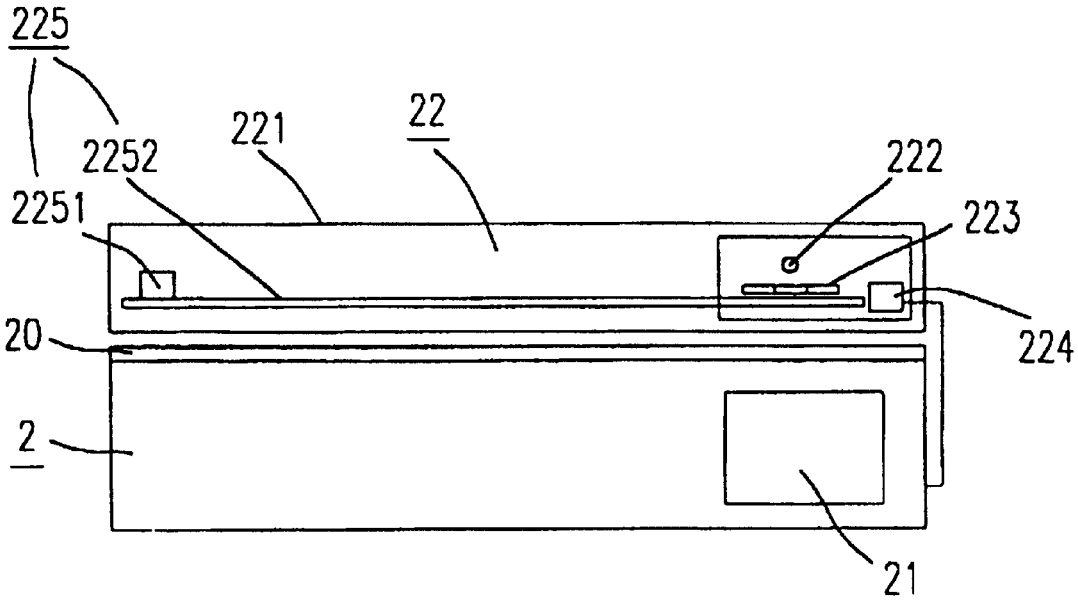
FIGS. 2(a)–2(d) are schematic diagrams respectively showing four embodiments of the image scanning device for scanning a transparent object according to the present invention.

FIG. 2(a) shows a first preferred embodiment of the image scanning device for scanning a transparent object according to the present invention. The image scanning device 2 includes a scanning platform 20 and an image-pickup module 21. The light source module 22 includes a cover 221, a light source being a cold cathode lamp 222, a RGB filter 223, a switching mechanism 224 (which is implemented with a motor), and a transmission mechanism 225 including a stepping motor 2251 and a guiding rod 2252. The transmission mechanism 225 is used to carry the light source 222, the RGB filter 223, and the switching mechanism 224 together to move with the image-pickup module 21, while the switching mechanism 224 is controlled to carry the RGB filter 223 to perform the switch operation. Then, the light to be transmitted to the scanning platform 20 will be alternated with red light, green light, and blue light, thereby completing the scanning operation to a colored transparent object.

Figure 2B:
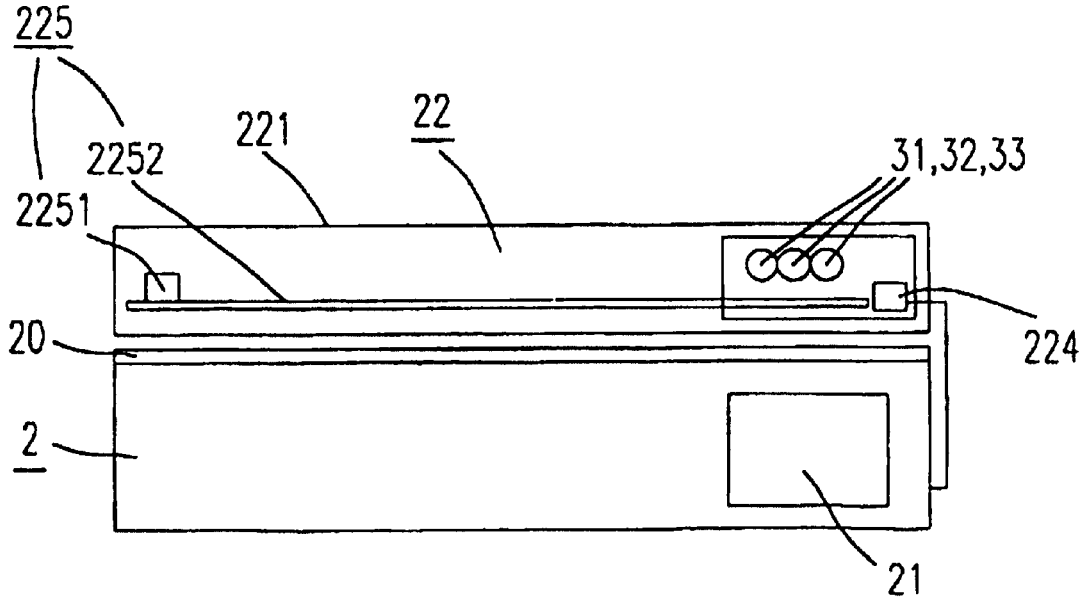

FIG. 2(b) shows a second preferred embodiment of the image scanning device for scanning a transparent object according to the present invention. Equivalently, the image scanning device 2 also includes a scanning platform 20 and an image-pickup module 21 similar to those in FIG. 2(a). The light source module 22 includes also a cover 221, a transmission mechanism 225 including a stepping motor 2251 and a guiding rod 2252. The major difference between FIG. 2(a) and FIG. 2 (b) is that the light source in FIG. 2(b) is a RGB cold cathode lamp or a combination of a red LED array 31, a green LED array 32, and a blue LED array 33 instead of a cold cathode lamp. The switching mechanism 224 can be implemented with a controlled multiple-throw, single-pole switch. While the transmission mechanism 225 carries the light source (31, 32, 33) and the switching mechanism 224 to move with the image-pickup module 21, the switching mechanism 224 is controlled to perform switch operation according to the ON and OFF state of the RGB cold cathode lamp or RGB LED arrays (31, 32, 33), and then the light to be transmitted to the scanning platform 20 will be alternated with red light, green light, and blue light.

Figure 2C:
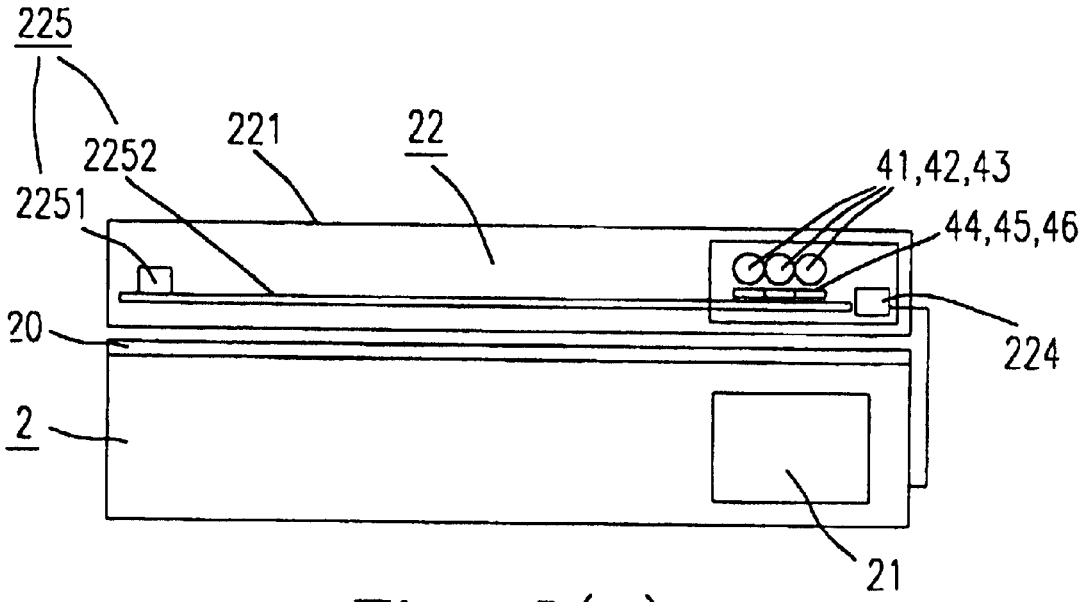

FIG. 2(c) shows a third preferred embodiment of the image scanning device for scanning a transparent object according to the present invention. It is to be noticed that unlike the light source module 220 of FIG. 2(a), the light source module of FIG. 2(c) is implemented with a combination of three white cold cathode lamps (41, 42, 43) and a RGB filtering device (44, 45, 46). The switching mechanism 224 can be implemented with a controlled multiple-throw, single-pole switch. With respect to other components in the image scanning device, they are similar to the foregoing embodiments and thus we will not have a further description herein.

Figure 2D:
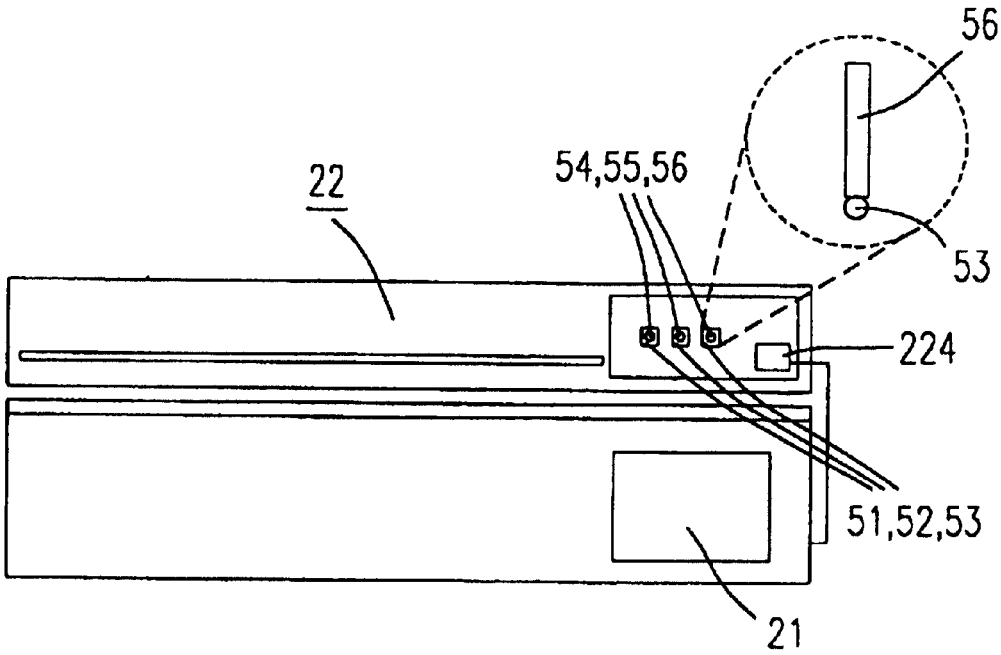

FIG. 2(d) shows a fourth preferred embodiment of the image scanning device for scanning a transparent object according to the present invention. The light source module is implemented with a combination of three light guides (51, 52, 53) and a combination of a red LED array 54, a green LED array 55, and a blue LED array 56. Each one of the RGB LED arrays (54, 55, 56) is respectively connected to one end of the corresponding light guide (51, 52, 53). The switching mechanism 224 can also be implemented with a controlled multiple-throw, single-pole switch. With respect to other components in the image scanning device, they are similar to the foregoing embodiments and thus we will not have a further description herein.

According to the above statements, the image scanning device for scanning transparent object of the present invention is capable of emitting lights of three original colors (red, green, blue) to scan the transparent object. Consequently, the color scanning operation can be achieved easily and the shortcomings encountered by the conventional TA can be overcome thoroughly.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the following claims.

I claim:

1. A light source module arranged in an image scanning device having a scanning platform and an image-pickup module for scanning a transparent object, comprising:

a cover;

three monochromatic light sources, each of which has a different color and mounted in said cover for emitting three different monochromatic lights to said scanning platform for scanning said transparent object;

three guiding devices, each of which is connected to one end of said three monochromatic light sources for guiding said three different monochromatic lights to said scanning platform;

a switching mechanism connected to said three guiding devices for being controlled to alternately allow one of said three different monochromatic lights to be transmitted to said scanning platform; and a transmission mechanism for carrying said three different monochromatic light sources, said three guiding devices, and said switching mechanism to move with said image-pickup module for accomplishing a scanning operation to said transparent object.

2. A light source module as set forth in claim 1 wherein said three monochromatic light sources include a combination of red LED array, and green LED array, and a blue LED array.

3. A light source module as set forth in claim 1 wherein said three guiding devices includes three light guides.

4. A light source module as set forth in claim 1 wherein said switching mechanical is implemented with a controlled multiple-throw, single-pole switch.

5. A light source module as set forth in claim 1 wherein said image-pickup module includes a contact image sensor (CIS) module.

*6. An apparatus, comprising:*

*three monochromatic light sources, wherein each of said three monochromatic light sources has a different color;*

*three guiding devices, wherein each of said three guiding devices is connected to one end of said three monochromatic light sources, said three guiding devices being configured to guide said three different monochromatic lights to a scanning platform; and*

*a switching mechanism connected to said three guiding devices, wherein said switching mechanism is configured to alternately allow one or more of said three monochromatic lights to be transmitted to said scanning platform.*

*7. The apparatus of claim 6, wherein said three monochromatic light sources comprise one or more of the following: a red monochromatic light source, a green monochromatic light source, and/or a blue monochromatic light source, or combinations thereof.*

*8. The apparatus of claim 6, wherein said three monochromatic light sources comprise one or more LED arrays.*

*9. The apparatus of claim 6, wherein said three guiding devices comprise one or more light guides.*

*10. The apparatus of claim 6, wherein said switching mechanism comprises a controlled multiple-throw single-pole switch.*

*11. The apparatus of claim 6, further comprising a transmission mechanism configured to move at lease one of said three monochromatic light sources, said three guiding devices, said switching mechanism, or combinations thereof.*

*12. A system, comprising:*

*a scanning platform;*

*three monochromatic light sources, wherein each of said three monochromatic light sources has a different color;*

*three guiding devices, wherein each of said three guiding devices is connected to one end of said three monochromatic light sources, said three guiding devices being configured to guide said three different monochromatic lights to said scanning platform;*

*a switching mechanism connected to said three guiding devices, wherein said switching mechanism is configured to alternately allow one or more of said three monochromatic lights to be transmitted to said scanning platform; and*

*an image-pickup module comprising one or more sensors capable of scanning an object.*

*13. The system of claim 12, wherein said three monochromatic light sources comprise one or more of the following: a red monochromatic light source, a green monochromatic light source, and/or a blue monochromatic light source, or combinations thereof.*

*14. The system of claim 12, wherein said three monochromatic light sources comprise one or more LED arrays.*

*15. The system of claim 12, wherein said three guiding devices comprise one or more light guides.*

*16. The system of claim 12, wherein said switching mechanism comprises a controlled multiple-throw, single-pole switch.*

*17. The system of claim 12, wherein said image-pickup module comprises a contact image sensor module.*

*18. The system of claim 12, further comprising a transmission mechanism capable of moving one or more of the following: said three monochromatic light sources, said three guiding devices, and/or said switching mechanism, or combinations thereof.*

*19. A method, comprising:*

*emitting three monochromatic lights of different color via three monochromatic light sources;*

*guiding said three monochromatic lights to a scanning platform via three guiding devices connected to one end of said three monochromatic light sources; and*

*alternately allowing one or more of said three monochromatic lights to be transmitted to said scanning platform via a switching mechanism connected to said three guiding devices.*

*20. The method of claim 19, wherein said three monochromatic lights of different color comprise one or more of the following: a red monochromatic light, a green monochromatic light, and/or a blue monochromatic light, or combinations thereof.*

*21. The method of claim 19, further comprising moving one or more of the following: said three monochromatic light sources, said three guiding devices, and/or said switching mechanism, or combinations thereof.*

*22. An apparatus, comprising:*

*means for emitting three monochromatic lights of different color;*

*means for guiding said three monochromatic lights to a scanning platform; and*

*means for alternately allowing one or more of said three monochromatic lights to be transmitted to said scanning platform.*

*23. The apparatus of claim 22, wherein said three monochromatic lights of different color comprise one or more of the following: a red monochromatic light, a green monochromatic light, and/or a blue monochromatic light, or combinations thereof.*

*24. The apparatus of claim 22, further comprising means for moving one or more of the following: said means for emitting three monochromatic lights, said means for guiding said three monochromatic lights, and/or said means for alternately allowing one or more of said three monochromatic lights to be transmitted, or combinations thereof.*

*25. An apparatus, comprising:*

*a plurality of monochromatic light sources, wherein said monochromatic light sources provide a plurality of different color lights;*

*a plurality of guiding devices, wherein at least one of said guiding devices is connected to one end of said monochromatic light sources, said guiding devices being configured to guide said different color lights to a scanning platform; and*

*a switching mechanism connected to said guiding devices, wherein said switching mechanism is configured to alternately allow at least one of said different color lights to be transmitted to said scanning platform.*

*26. The apparatus of claim 25, wherein said two or more monochromatic light sources comprise one or more of the following: a red monochromatic light source, a green monochromatic light source, and/or a blue monochromatic light source, or combinations thereof.*

*27. The apparatus of claim 25, further comprising a transmission mechanism capable of moving one or more of the following: said two or more monochromatic light sources, said two or more guiding devices, and/or said switching mechanism, or combinations thereof.*

*28. The apparatus of claim 25, further comprising:*

*a scanning platform; and*

*an image-pickup module including at least one sensor configured to scan an object.*

*29. A method, comprising:*

*emitting a plurality of different color monochromatic lights via a plurality of monochromatic light sources;*

*guiding said different color monochromatic lights to a scanning platform via a plurality of guiding devices connected to one end of said monochromatic light sources; and*

*alternately allowing at least one of said different color monochromatic lights to be transmitted to said scanning platform via a switching mechanism connected to said guiding devices.*

*30. The method of claim 29, wherein said different color monochromatic lights comprise at least one of a red monochromatic light, a green monochromatic light, a blue monochromatic light, or combinations thereof.*

*31. The method of claim 29, further comprising moving one or more of the following: said monochromatic light sources, said guiding devices, said switching mechanism, or combinations thereof.*

*32. An apparatus, comprising:*

*means for emitting a plurality of different color monochromatic lights;*

*means for guiding said different color monochromatic lights to a scanning platform; and*

*means for alternately allowing at least one of said different color monochromatic lights to be transmitted to said scanning platform.*

*33. The apparatus of claim 32, wherein said different color monochromatic lights comprise at least one of a red monochromatic light, a green monochromatic light, a blue monochromatic light, and combinations thereof.*

*34. The apparatus of claim 32, further comprising means for moving at least one of said means for emitting different color monochromatic lights, said means for guiding said different color monochromatic lights, said means for alternately allowing at least one of said different color monochromatic lights to be transmitted and combinations thereof.*

*35. An apparatus, comprising:*

*a plurality of monochromatic light sources, wherein each of the monochromatic light sources emits a different color monochromatic light;*

*a plurality of guiding devices configured to guide the different color monochromatic lights to a scanning platform, wherein individual guiding devices are connected to individual monochromatic light sources; and*

*a switching mechanism connected to the guiding devices, wherein the switching mechanism is configured to control alternately guiding the different color monochromatic lights to the scanning platform.*

*36. The apparatus of claim 35, further comprising a transmission mechanism positioned to move the guiding devices with respect to the scanning platform, wherein the transmission mechanism is configured to move the guiding devices with an image-pickup module during a scanning operation.*

*37. The apparatus of claim 35, further comprising a transmission mechanism positioned to move the monochromatic light sources, the guiding devices, and the switching mechanism with respect to the scanning platform, wherein the transmission mechanism is configured to move the monochromatic light sources, the guiding devices, and the switching mechanism with an image-pickup module during a scanning operation.*

*38. A method of producing a digital image of a color transparency with a scanner, the scanner including an image-pickup module positioned under a scanning platform and a cover pivotally coupled over the scanning platform, the method comprising:*

*emitting a first color monochromatic light from a first light source;*

*guiding the first color monochromatic light to the color transparency via a first guiding device connected to the first light source;*

*emitting a second color monochromatic light from a second light source, the second color monochromatic light being different from the first color monochromatic light;*

*guiding the second color monochromatic light to the color transparency via a second guiding device connected to the second light source;*

*emitting a third color monochromatic light from a third light source, the third color monochromatic light being different from the first and second color monochromatic light;*

*guiding the third color monochromatic light to the color transparency via a third guiding device connected to the third light source; and*

*switching between the first, second, and thaird color monochromatic light to pass through the color transparency.*

*39. The method of claim 38, further comprising:*

*passing the first, second, and third color monochromatic light through the color transparency; and*

*detecting the first, second, and third color monochromatic light with the image-pickup module.*

*40. The method of claim 38, further comprising:*

*moving the image-pickup module with respect to the scanning platform; and*

*moving at least one of the first light source, the second light source, the third light source, the first guiding device, the second guiding device, third guiding device, switching device, or combinations thereof in conjunction with moving the image-pickup module.*

*41. The method of claim 38 wherein at least one of the first light source, the second light source, the third light source, the first guiding device, the second guiding device, third guiding device, switching device, or combinations thereof are configured for moving with respect to the cover.*

* * * * *